US011611911B2

(12) United States Patent
Ivri et al.

(10) Patent No.: US 11,611,911 B2
(45) Date of Patent: Mar. 21, 2023

(54) METHODS AND APPARATUS FOR NETWORKING ON MOVING PLATFORM

(71) Applicant: Siemens Canada Limited, Burlington (CA)

(72) Inventors: Noam Ivri, Modii'n (IL); William Zhao, Richmond Hill (CA)

(73) Assignee: Siemens Canada Limited, Oakville (CA)

( * ) Notice: Subject to any disclaimer, the term of this patent is extended or adjusted under 35 U.S.C. 154(b) by 0 days.

(21) Appl. No.: 17/261,593

(22) PCT Filed: Aug. 13, 2018

(86) PCT No.: PCT/US2018/046433
§ 371 (c)(1),
(2) Date: Jan. 20, 2021

(87) PCT Pub. No.: WO2020/036576
PCT Pub. Date: Feb. 20, 2020

(65) Prior Publication Data
US 2021/0266795 A1    Aug. 26, 2021

(51) Int. Cl.
*H04W 36/30* (2009.01)
*H04W 40/12* (2009.01)
(Continued)

(52) U.S. Cl.
CPC ....... *H04W 36/0009* (2018.08); *H04W 36/30* (2013.01); *H04W 40/12* (2013.01); *H04W 84/005* (2013.01)

(58) Field of Classification Search
CPC . H04W 36/0009; H04W 36/30; H04W 40/12; H04W 84/005
See application file for complete search history.

(56) References Cited

U.S. PATENT DOCUMENTS 8,849,286 B2 * 9/2014 Cai .................. H04W 36/0088
455/438
9,094,792 B2 * 7/2015 Nagaraj ................ G01S 5/0252
(Continued)

FOREIGN PATENT DOCUMENTS

GB          2569399 A        6/2019
JP       2002524941 A   *   8/2002
(Continued)

OTHER PUBLICATIONS

Yang Yibo et al: "Mobility management in VANET", 2013 22nd Wireless and Optical Communication Conference, IEEE, May 16, 2013 (May 16, 2013), pp. 298-303, XP032526115, 6 pages.
(Continued)

*Primary Examiner* — Ahmed Elallam (57) ABSTRACT

A routing device for installation on a moving platform connects with multiple wireless access devices for wireless interconnection with a wide-area network (WAN). The routing device routes traffic to the WAN through an active one of the wireless access devices. The routing device monitors connection quality between each of the wireless access devices and the WAN and in response to the metric of connection quality for the wireless access device at the active port dropping below a threshold value, reconfigure the routing device to route data traffic to the WAN through a wireless access device at a targeted one of the ports, different from the active one of the ports.

22 Claims, 10 Drawing Sheets

(51) Int. Cl.
    *H04W 36/00*     (2009.01)
    *H04W 84/00*     (2009.01)

(56) References Cited

U.S. PATENT DOCUMENTS

| | | | |
|---|---|---|---|
| 9,577,738 B2* | 2/2017 | Nilsson | H01Q 1/246 |
| 10,433,215 B2* | 10/2019 | Maguire | H04L 69/14 |
| 11,272,519 B2* | 3/2022 | Karlsson | H01Q 1/243 |
| 2009/0003269 A1 | 1/2009 | Kumazawa et al. | |
| 2009/0219900 A1* | 9/2009 | Kokkinen | B61L 15/0027 |
| | | | 370/338 |
| 2014/0247807 A1* | 9/2014 | Westerberg | H04W 36/34 |
| | | | 370/331 |
| 2015/0181502 A1 | 6/2015 | Hans et al. | |
| 2016/0249233 A1* | 8/2016 | Murray | H04W 16/26 |
| 2018/0102830 A1* | 4/2018 | Lange | H04B 7/2606 |

FOREIGN PATENT DOCUMENTS

| | | |
|---|---|---|
| WO | 2016/156949 | 10/2016 |
| WO | 2017/053742 | 3/2017 |

OTHER PUBLICATIONS

PCT Search Report dated Dec. 4, 2018, for PCT Application No. PCT/US2018/046433, 15 pages.

* cited by examiner

| Link Status Score | | | |
|---|---|---|---|
| MCS | Repetition | MIMO Type capability | score |
| Link Disconnected | | | 0-10 |
| QPSK 1/2 | 6 | A | 11 |
| QPSK 1/2 | 4 | A | 12 |
| QPSK 1/2 | 2 | A | 13 |
| QPSK 1/2 | 1 | A | 14 |
| QPSK 3/4 | 1 | A | 15 |
| 16 QAM 1/2 | 1 | A | 16 |
| 16 QAM 3/4 | 1 | A | 17 |
| 64 QAM 1/2 | 1 | A | 18 |
| 64 QAM 2/3 | 1 | A | 19 |
| 64 QAM 3/4 | 1 | A | 20 |
| 64 QAM 5/6 | 1 | A | 21 |
| 64 QAM 1/2 | 1 | B | 22 |
| 64 QAM 2/3 | 1 | B | 23 |
| 64 QAM 3/4 | 1 | B | 24 |
| 64 QAM 5/6 | 1 | B | 25 |

METHODS AND APPARATUS FOR NETWORKING ON MOVING PLATFORM

FIELD

This relates to computer networking, and in particular, to wirelessly connecting to networks from physically moving platforms such as vehicles.

BACKGROUND

Computer networks are typically configured in a tiered architecture: local networks (LANs) may serve and interconnect devices within a relatively small physical area, and a device referred to as a gateway may interface a local network with other networks such as other LANs, or wide-area networks (WANs) such as private WANs or the internet.

Some LANs may be installed on moving platforms such as vehicles. For example, LANs may be installed in cars, trucks, buses, ships, trains and rail cars, aircraft and the like. Such LANs may serve devices such as control, telemetry or other operational systems, occupant computing devices, or the like.

In some applications, it may be desired to interface a LAN on a moving platform (also referred to herein as a moving network) with a fixed network such as a cellular network. However, maintaining connectivity between fixed and physically moving devices poses challenges.

For example, wireless access devices such as WiMAX stations, cellular modems, smartphones and the like typically experience reduced bandwidth or connectivity and may switch between base stations as they approach the margin between the service areas of two base stations. The switching process is referred to as handoff or handover. Unfortunately, handover processes can lead to temporary loss of connectivity or lost data packets while handover is negotiated and completed.

SUMMARY

An example networking infrastructure for accessing a wide-area network (WAN) from a moving platform comprises: a plurality of wireless access devices for wireless interconnection with base stations of the wide-area network (WAN), wherein the wireless access devices are handed off between base stations when a connection deteriorates; a routing device having an interface connected to each respective one of the wireless access devices, and an interface for connection to a client device, the routing device configured to route traffic to the WAN through an active one of the wireless access devices; and a processor at the routing device, configured to: monitor a metric of connection quality between said active wireless access device and said WAN; and in response to the metric of connection quality for the active wireless access device dropping below a threshold value, reconfigure the routing device to route data traffic to the WAN through a targeted one of the wireless access devices, different from the active one of the wireless access devices.

A routing device for installation on a moving platform, comprising: a plurality of ports for connection to wireless access devices for wireless interconnection with base stations of a wide-area network (WAN), wherein the wireless access devices are handed off between base stations when a connection deteriorates said routing device configured to route traffic to said WAN through a wireless access device at an active one of said ports; an interface for connection to a client device, the routing device configured to route traffic to the WAN through a wireless access device at an active one of the ports; and a processor, configured to: monitor a metric of connection quality between said wireless access devices at said active one of said ports and said WAN; and in response to the metric of connection quality for the wireless access device at the active port dropping below a threshold value, reconfigure the routing device to route data traffic to the WAN through a wireless access device at a targeted one of the ports, different from the active one of the ports.

A routing method in a computing network, comprising, at a routing device: configuring a data path to direct data traffic towards a wide-area network (WAN) through a first wireless access device; monitoring a metric of connection quality between said first wireless access device and said WAN; and in response to the metric of connection quality for the first wireless access dropping below a threshold value, reconfiguring the data path to route data traffic to the WAN through a second wireless access device, different from the active one of the ports.

BRIEF DESCRIPTION OF DRAWINGS

In the drawings, which depict example embodiments.

DETAILED DESCRIPTION

Figure 1:
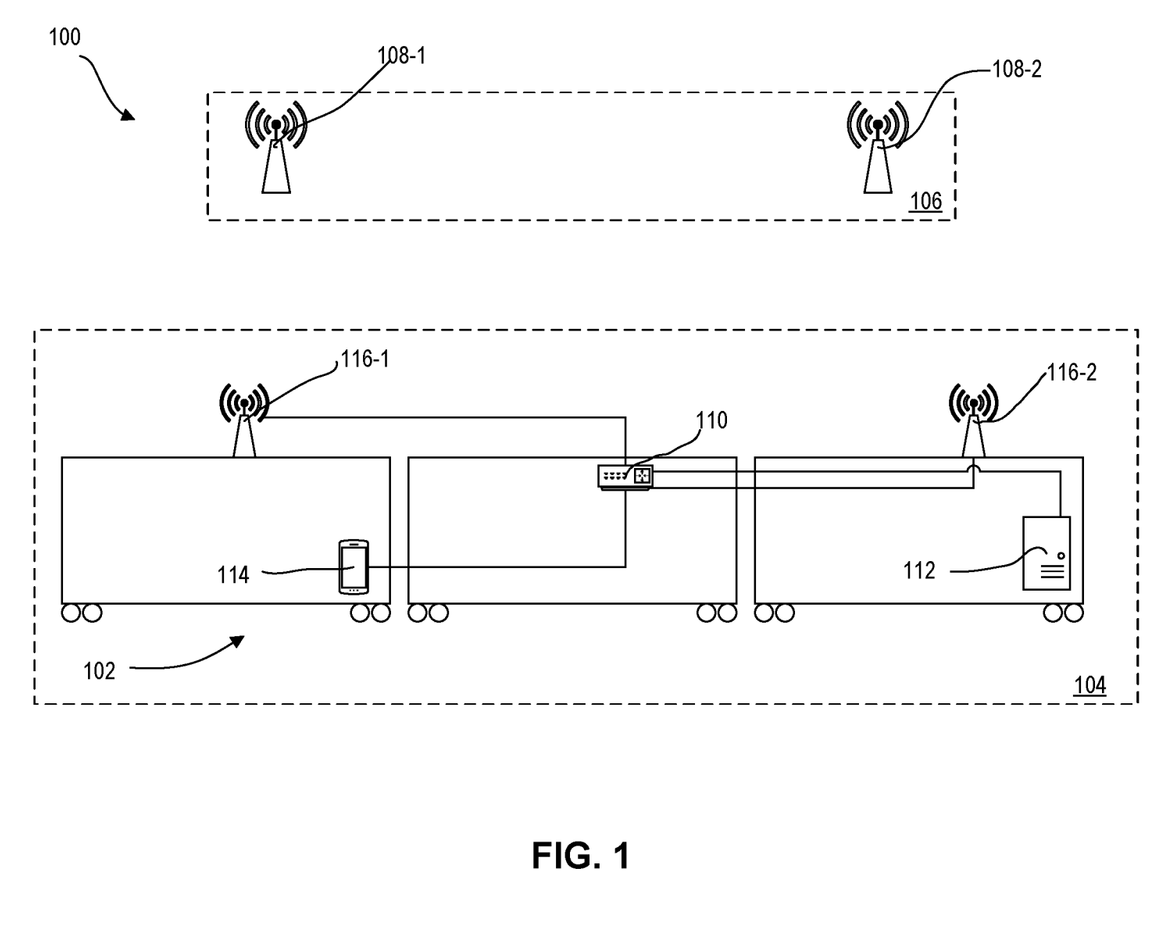
FIG. 1 is a schematic diagram of a network on a moving platform.

FIG. 1 depicts a networking environment 100 which includes a moving platform, namely, a train 102.

Train 102 has a plurality of computing or communications assets installed thereon, which are interconnected by a LAN 104. LAN 104 and may be referred to herein as a local network (LAN).

As will be described in further detail, LAN 104 is interconnected with another network. The other network may be, for example, a wide-area network (WAN) 106, such as the internet, or a wide-area private network (private WAN).

WAN 106 includes base stations 108-1, 108-2 (individually and collectively, base stations 108). Although two base stations 108 are illustrated, it will be appreciated that WAN 106 may include any number of base stations 108. Base stations 108 are stationary and may use any suitable wireless networking technology. For example, in the depicted embodiment, base stations 108 are WiMAX stations. In other examples, base stations 108 may communicate using cellular technologies, such as GSM, GPRS, EDGE, UMTS, LTE or the like.

Each base station serves a specific physical area, which may be referred to as a cell. Both base stations 108 and their respective cells are fixed in space. As train 102 moves, it traverses cells.

LAN 104 is a routed internet protocol (IP) network including devices connected by way of Ethernet links and by way of wireless technologies such as IEEE 802.11 (Wi-Fi).

Figure 2:
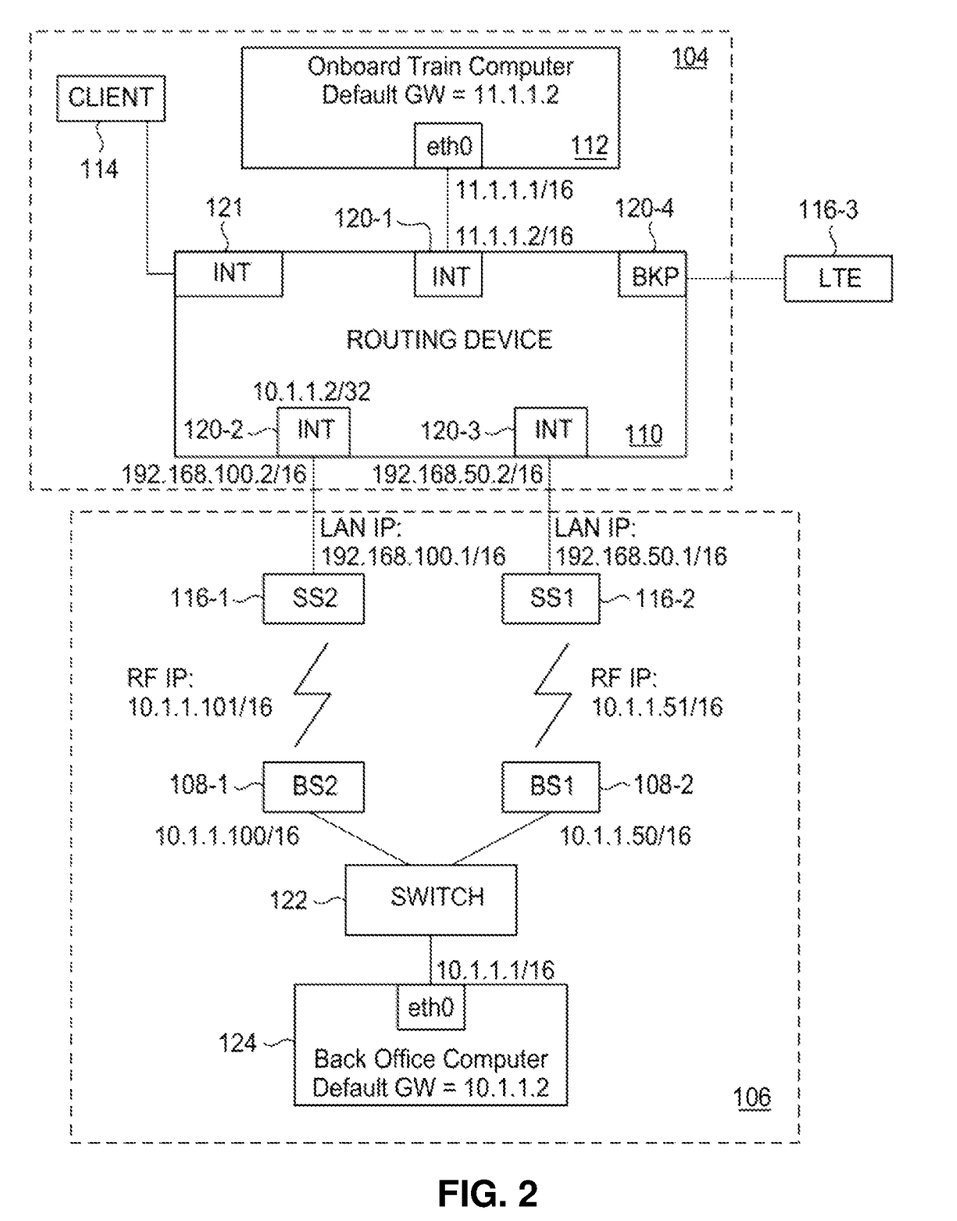
FIG. 2 is a schematic diagram of topology of the network of FIG. 1.

LAN 104 includes a routing device 110, a plurality of client devices such as wired client devices 112 and wireless client devices 114 (collectively referred to as client devices), and wireless access devices 116-1, 116-2, 116-3 (individually and collectively, wireless access devices 116). Wireless access devices 116-1, 116-2, are shown in FIG. 1 whereas wireless access devices 116-1, 116-2, and 116-3 are shown in FIG. 2.

In the depicted example, wired client 112 is a control and telemetry system of train 102. Client 112 may receive operating instructions and the like from devices on WAN 106 and may return data such as telemetry and status data to devices on WAN 106. As will be apparent, such data communications may contribute significantly to safe and effective operation of train 102. Moreover, such data communications may be highly time-sensitive. For example, data related to hazards and the like may be received in near real time. As will be apparent, such real-time communication may require substantially uninterrupted connectivity with devices on WAN 106.

LAN 104 may also include one or more wireless clients 114 connected with routing device 110 by way of a wireless link, e.g. IEEE 802.11 Wi-Fi. Wireless clients 114 may include, for example, vehicle control or telemetry devices or the like, or devices of vehicle occupants. Such clients may include, for example, mobile computing devices such as laptops, smart phones, tablet PCs and the like.

Routing device 110 interconnects with wireless access devices 116 for exchanging data with WAN 106. In the depicted embodiment, wireless access devices 116-1, 116-2 (shown in FIGS. 1 and 2) are WiMAX subscriber stations, configured to communicate with corresponding base stations 108-1, 108-2 in WAN 106. Alternatively or additionally, wireless access devices 116 may be cellular (e.g. LTE) modems. Other suitable RF networking technologies may be used, as will be apparent to skilled persons. Wireless access device 116-3 (shown in FIG. 2) is a backup device and connects to different base stations, using a different technology than base stations 116-1, 116-2. For example, as depicted, wireless access devices 116-1, 116-2 are WiMAX stations and wireless access device 116-3 is a cellular modem. Wireless access device 116-3 may interface with WAN 106 indirectly, e.g., over a public WAN such as the internet, through a virtual private network (VPN). As will be apparent, providing multiple types of wireless access devices 116, for connection with multiple types of base stations 108, may contribute to robust connectivity with WAN 106.

As noted, as train 102 moves, it traverses cells served by successive base stations 108. Accordingly, connection quality between a given wireless access device 116 and the corresponding base station may vary over time. At the margin of a cell served by a particular base station 108, the wireless access device may need to be handed over to another (e.g. closer) base station. Typically, the decision of when to effect a handover is handled by the base station 108 or access device 116. As described in further detail below, routing device 110 is configured to monitor connection quality and to transition to using another wireless access device 116 prior to occurrence of a handover or handover attempt. In other words, routing device 110 may avoid disruptions of connectivity by anticipating loss of connectivity at a first access device and switching to a second device before the loss of connectivity occurs.

FIG. 2 depicts an example topology of networks 104, 106 and devices in those networks in greater detail.

In the depicted embodiment, routing device 110 has a plurality of routed Ethernet ports 120. Four ports 120 are shown, labelled individually as ports 120-1, 120-2, 120-3, 120-4. However, more or fewer ports may be present. Routing device 110 may also have one or more wireless (e.g. wi-fi) interfaces 121.

Port 120-1 connects wired client 112 to routing device 110. Ports 120-2, 120-3 connect wireless access devices 116-1, 116-2, respectively, to routing device 110. Port 120-4 is a backup port, for connection with a backup access server such as an LTE modem wireless interface 121 connects wireless client 114 to routing device 110.

In the depicted embodiment, the devices of LAN 104 are divided into two logical groups, referred to as subnets. A first subnet includes clients 112, 114 and the routed ports of routing device 110 to which they are connected. A second subnet includes wireless access devices 116 and the routed ports of routing device 110 to which they are connected.

The two subnets may be defined by the IP addresses of the various devices, e.g., as assigned by routing device 110. Specifically, client devices 112, 114 and their respective ports of routing device 110 may be assigned IP addresses within a first network range, e.g. 11.1.1.*. Wireless access devices 116 may be assigned IP addresses within a second network range, e.g. 192.168.*.*. For example, in the depicted embodiment, wired client 112 is assigned an IP address of 11.1.1.1/16 and its associated physical port 120-1 of routing device 110 is assigned an IP address of 11.1.1.2/16. Wireless access device 116-1 is assigned an IP address of 192.168.100.1/16 and its associated physical port 120-2 of routing device 110 is assigned an IP address of 192.168.100.2/16. Wireless access device 116-2 is assigned an IP address of 192.168.50.1/16 and its associated physical port 120-3 of routing device 110 is assigned an IP address of 192.168.50.2/16. In the depicted embodiment, the separate subnet 192.168.*.* and 11.1.1.* serve to segregate LAN clients (on subnet 11.1.1.*) and devices involved in management of access devices 116 (subnet 192.168.*.*).

Routing device 110 provides for communication between devices by defining data pathways for data packets depending packet destinations. In the depicted embodiment, each client and wireless access device 116 has a unique IP address. Data pathways are defined by a routing policy, namely, one or more tables or other structures identifying routing paths for various destination addresses. The routing policy may define a default route, that is, an IP address to which all packets will be forwarded unless otherwise provided in the policy. The default route may, for example, be applied to packets with all destination addresses outside of LAN 104.

As depicted, wireless access devices 116 are connected by RF wireless links with respective base stations 108 that form part of WAN 106. Base stations 108 are further connected with one or more client devices 124.

Client devices 124 may, for example, be back-end computing devices for exchanging data such as control and telemetry data with devices at train 102.

In the depicted embodiment WAN 106 is a private WAN. Devices on WAN 106 are assigned addresses in the network range 10.1.1.*/16.

Wireless access devices 116 form part of LAN 104 and part of WAN 106. That is, wireless access devices 116 are assigned IP addresses within LAN 104 and within WAN 106, and are capable of forwarding data packets from WAN 106 toward LAN 104 and vice-versa. Thus, wireless access devices 116 are capable of interconnecting client devices 112, 114 with other devices in WAN 106. As noted, wired client 112 may be responsible for critical functions such as control, telemetry or safety functions, which may require connectivity with client device 124. To assist with maintaining connectivity, wireless access devices 116 a reporting protocol that is continuously or periodically executed by a processor at the wireless access device.

Figure 3:
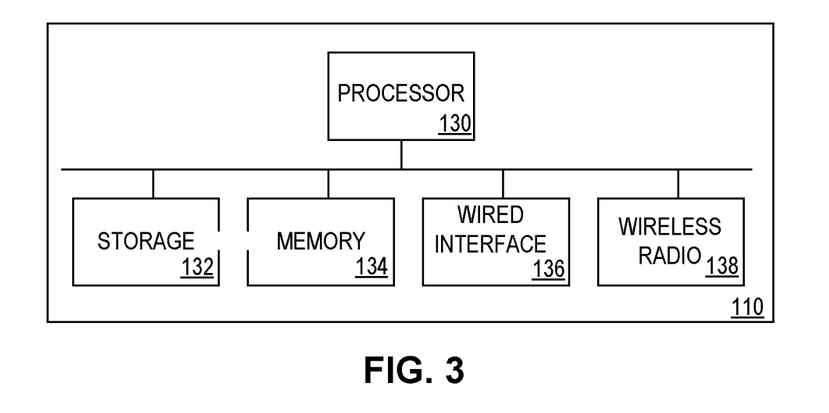
FIG. 3 is a block diagram of a routing device of the network of FIG. 1.
Figure 4:
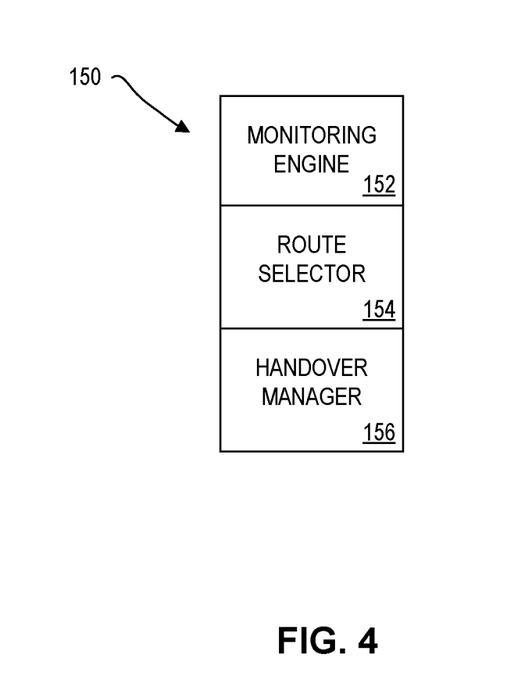
FIG. 4 is a block diagram of process units at the routing device of FIG. 3.

FIGS. 3-4 depict components of an example routing device 110 in greater detail. As shown in FIG. 3, routing device 110 includes a processor 130, storage 132, memory 134, a wired interface such as an Ethernet interface 136, and a wireless radio 138 such as an LTE radio. As will be apparent, FIG. 4 is a representative example, and routing devices in other configurations are possible.

Processor 130 may be a general-purpose computer processor such as an ARM or x86-based processor, and may operate under control of software stored at storage 132. Alternatively, processor 130 may include an application-specific integrated circuit (ASIC) for performing some or all of the functions described herein.

FIG. 4 depicts example process units 150 at routing device 110. Process units 150 may be software components which configure processor 130 to perform functions described herein. Alternatively or additionally, some or all of process units 130 may be implemented directly in hardware, e.g. by way of a specialized ASIC.

Process units 150 include a monitoring engine 152, a route selector 154, and a transition manager 156.

Figure 5:
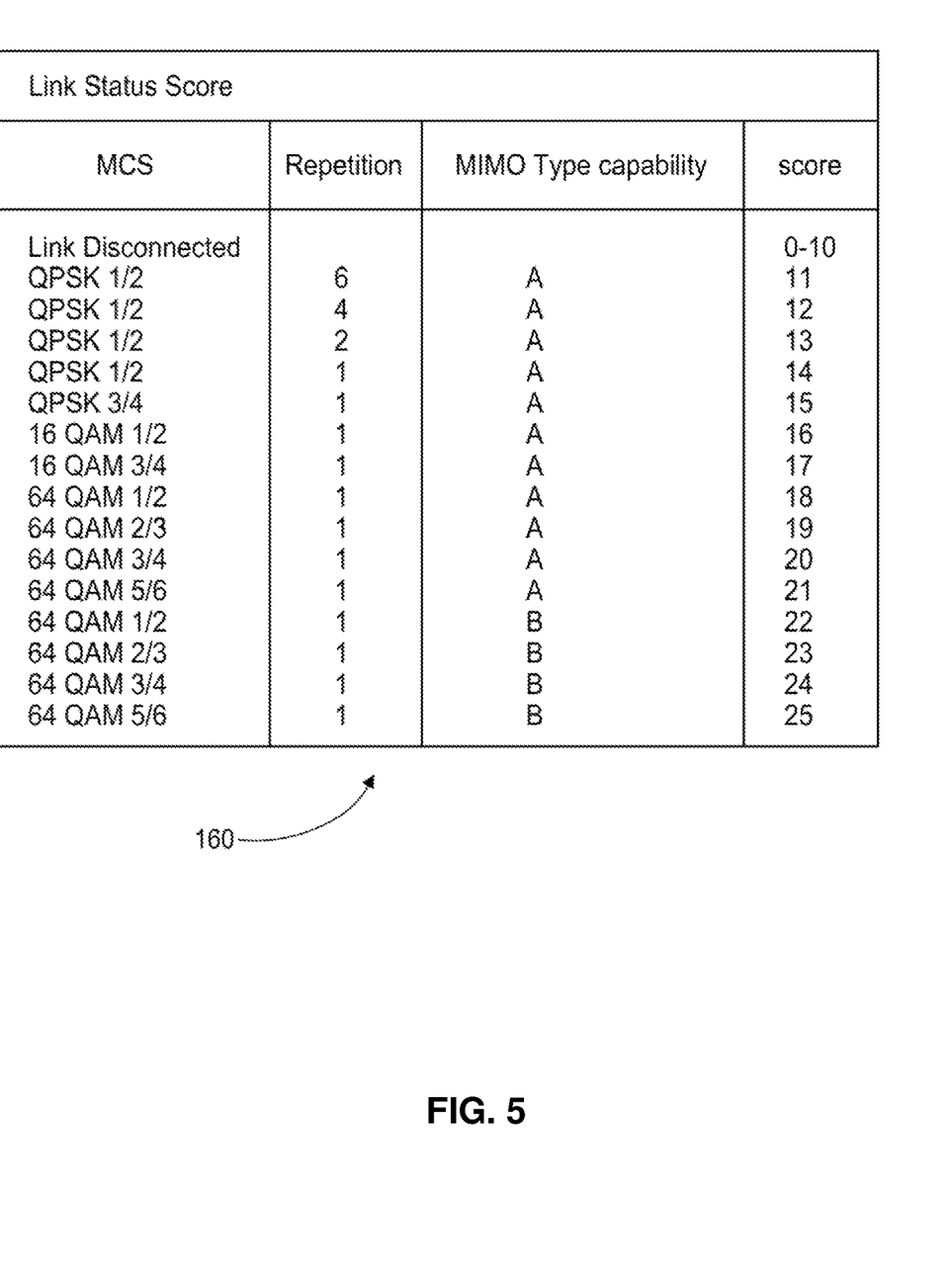
FIG. 5 is a representation of a data structure at the routing device of FIG. 3, for scoring connection quality.

Monitoring engine 152 is responsible for obtaining measurements of connection quality between wireless access devices 116 and their respective base stations 108. In an example, monitoring engine 152 periodically polls each wireless access device 116 for an indication of connection status. A score is assigned to each wireless access device based on the connection status. FIG. 5 depicts an example data structure 160 defining a scoring system.

As shown in FIG. 5, a score is assigned to each connection based on a modulation scheme in use on the connection. The modulation scheme being used is itself dependent on the connection quality between the wireless access device 116 and base station 108. That is, a stronger signal with relatively little noise will support a more efficient or higher rate modulation scheme, while a weak or noisier signal may necessitate use of a robust modulation scheme with less data throughout.

In the depicted example, scoring of connections is on a 25 point scale based on the downlink modulation data rate of the wireless access device 116. The maximum score of 25 is assigned to connections at the highest data rate. In the depicted example, the highest date rate modulation is 64 QAM 5/6, i.e. the highest modulation possible within the IEEE 802.11n standard. However, in other examples, higher rates may be available, e.g. by way of 802.11ac wireless link. The score is reduced by one point for each modulation reduction. Scores lower that 10 are indicative of a disconnected state. Scores may be further reduced, e.g. by 2 points, if a handover of the wireless access device 116 is in progress or about to begin.

In some embodiments, scoring of connections is done at routing device 110. In such embodiments, monitoring engine 152 may periodically poll wireless access devices 116, which may report parameters indicative of the connection strength or quality. For example, devices 116 may report a modulation type. Monitoring engine 152 may then assign a score by look up in data structure 160.

In other embodiments, scores may be assigned at devices 116. That is, monitoring engine 152 may periodically poll devices 116, which may be configured to determine a score based on look up in copies of data structure 160 stored locally at each device 116.

Thus, the assigned score is a metric of connection quality. In some embodiments, the score may be used on the modulation type. Additionally or alternatively, the score may take other factors into account. Possible factors may include, for example, signal to noise ratio, signal strength and bit error rate.

In the depicted embodiment, scores below 10 are interpreted as indicative of a disconnected state. However, in some embodiments, score below 10 may be used to indicate discrete connection strengths. For example, the scoring system may provide for more gradations, namely from 0-25 rather than 10-25.

Polling may be done individually for each wireless access device 116. That is, a separate processing thread may be responsible for polling each wireless access device 116. Alternatively, all wireless access devices 116 may be polled contemporaneously, which may be triggered by a single processing thread.

Monitoring engine 152 is configured to provide an output message to route selector 154 after polling is complete. The output message contains reported scores and identifiers of the wireless access devices to which the scores correspond. For example, the output may include pairs of scores with corresponding IP addresses. If wireless access devices 116 are polled individually from separate processing threads, individual scores may be provided to route selector 154. Alternatively, if wireless access devices 116 are polled together, a single output message may be provided, containing multiple scores.

Route selector 154 is configured to receive the score output from monitoring engine 152, and to define a data pathway by selecting a wireless access device 116 to interconnect LAN 104 with WAN 106, referred to as the active wireless access device 116.

On selection of a wireless access device as the active wireless access device, route selector directs outbound traffic through the active wireless access device 116 to WAN 106. For example, IP routing tables at routing device may define a default route to the active wireless access device 116.

In the depicted embodiment, route selector 154 is configured to as a state machine. That is, route selector 154 may operate in different states and, according to the state of route selector 154, the route selector can apply one of a plurality of algorithms to select a wireless access device 116.

Figure 6:
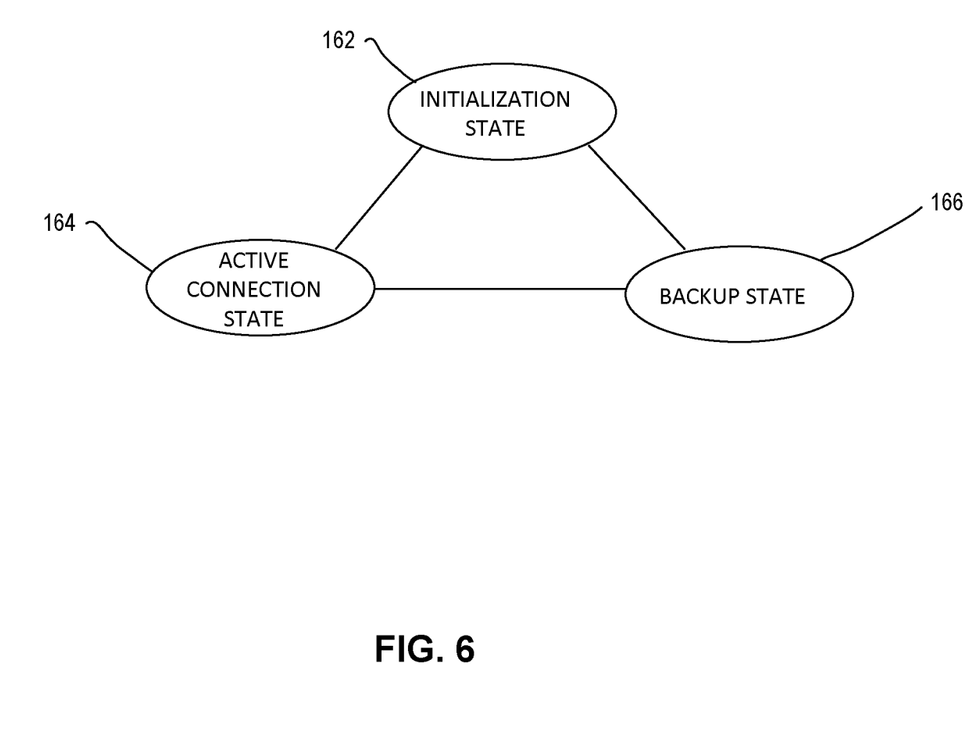
FIG. 6 is a flow chart depicting operating states of a route selector of the routing device of FIG. 3.

FIG. 6 is a schematic representation of states of route selector 154. As shown, route selector has three states 162, 164, 166.

State 162 is an initialization state, in which the active wireless access device is chosen based on a physical port at routing device 110. For example, the default active wireless access device may be the device on a specific port 120 of routing device 110.

State 164 is a state in which one of wireless access devices 116 is selected as active based on its connection strength score, as provided by monitoring engine 152.

State 166 is a back-up state in which a back-up connection to network is used in the event that no wireless access device 116 provides a sufficiently strong connection (i.e. no device 116 has a connection score above a minimum threshold).

Route selector 154 periodically receives updates to connection scores from monitoring engine 152. At each update, route selector 154 compares the received scores against threshold values and against values for the current active wireless access device. Based on those comparisons, route selector 154 may select a new active wireless access device 116 and may transition to a new state 162, 164, 166. Specifically, route selector 154 may rely on upper and lower threshold values for deciding when to select a new active wireless access device 116. The lower threshold may be a minimum acceptable connection quality for a currently-active wireless access device 116. That is, route selector 154 may select a new wireless access device 116 in the event that the signal quality of the currently-active wireless access device 116 drops below the lower threshold value. The upper threshold value may be a minimum acceptable connection quality for a newly-targeted wireless access device 116. That is, route selector 154 may only transition to a new wireless access device 116 if that new device has a signal quality at least above the upper threshold.

The lower and upper threshold values may be referred to as tuning values, because they may be used to tune the performance of routing device 110.

In particular, the quality of a connection is generally inversely related to the likelihood that the connection will drop or be handed over to a new base station. Thus, increasing the lower threshold value will tend to increase the frequency of transitions and decrease the likelihood that a handover or connectivity drop occurs before a transition is made.

Similarly, for a newly-targeted wireless access device 116, the quality of its connection is generally related to the length of time over which the connection is likely to maintain an acceptable quality. Accordingly, increasing the upper threshold may tend to reduce bouncing of connections, namely, making short-lived connection changes, but may reduce the likelihood that a transition is successfully made prior to a connection drop or handover.

Route selector 154 is configured to provide an output message to transition manager 156. The output message includes an identification of a wireless access device 116 targeted to be used as the active wireless access device 116.

Transition manager 156 is triggered by the output message from route selector 154.

Transition manager 156 is configured to establish a connection for a new active wireless access device and to transition routing to the new active wireless access device prior to breaking the connection of the previous wireless access device. This may be referred to as a make before break transition strategy.

Figure 7:
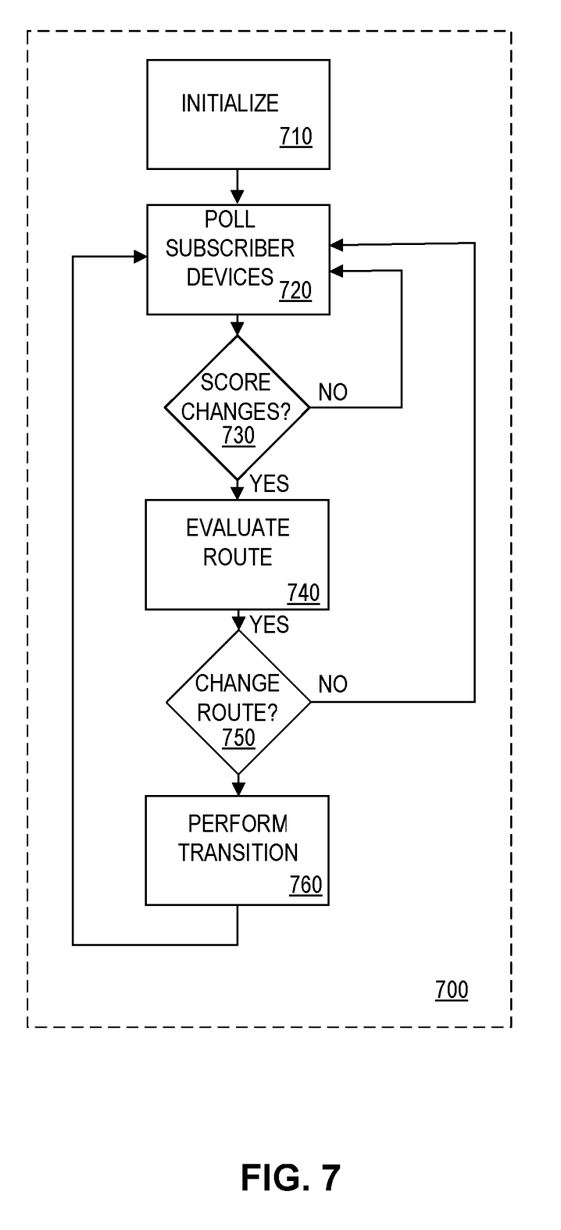
FIG. 7 is a flow chart depicting a networking method performed at the routing device of FIG. 3.

FIG. 7 depicts an example routing method 700 performed at routing device 110.

At block 710, routing device 110 is initialized. As part of the initialization process, the routing device 110 is set to the initialization state 162 (FIG. 6) and a wireless access device 116 is selected as the active wireless access device based on the port of routing device 110 to which it is attached. In the depicted embodiment, device 116-1 is selected. Data packets directed to addresses outside LAN 104 are sent to device 116-1, for example, by setting a default route is set in the routing table of device 110 which lists the IP address of device 116-1 as the next hop.

At block 720, monitoring engine 152 polls wireless access devices 116 for connection status information. Wireless access devices 116 either locally determine connection strength scores according to data structure 160 and return the scores, or return data, such as modulation type, based on which monitoring engine 152 assigns scores. Polling at block 720 may occur periodically, e.g., based on a clock at routing device 110. Scores may be recorded in a data structure for comparison with subsequent scores.

At block 730, monitoring engine 152 determines if any of the received scores differ from scores previously recorded. If not, the process returns to polling at block 720. If any changes occur, a prompt is provided to route selector 154, along with updated score data.

Figure 8A:
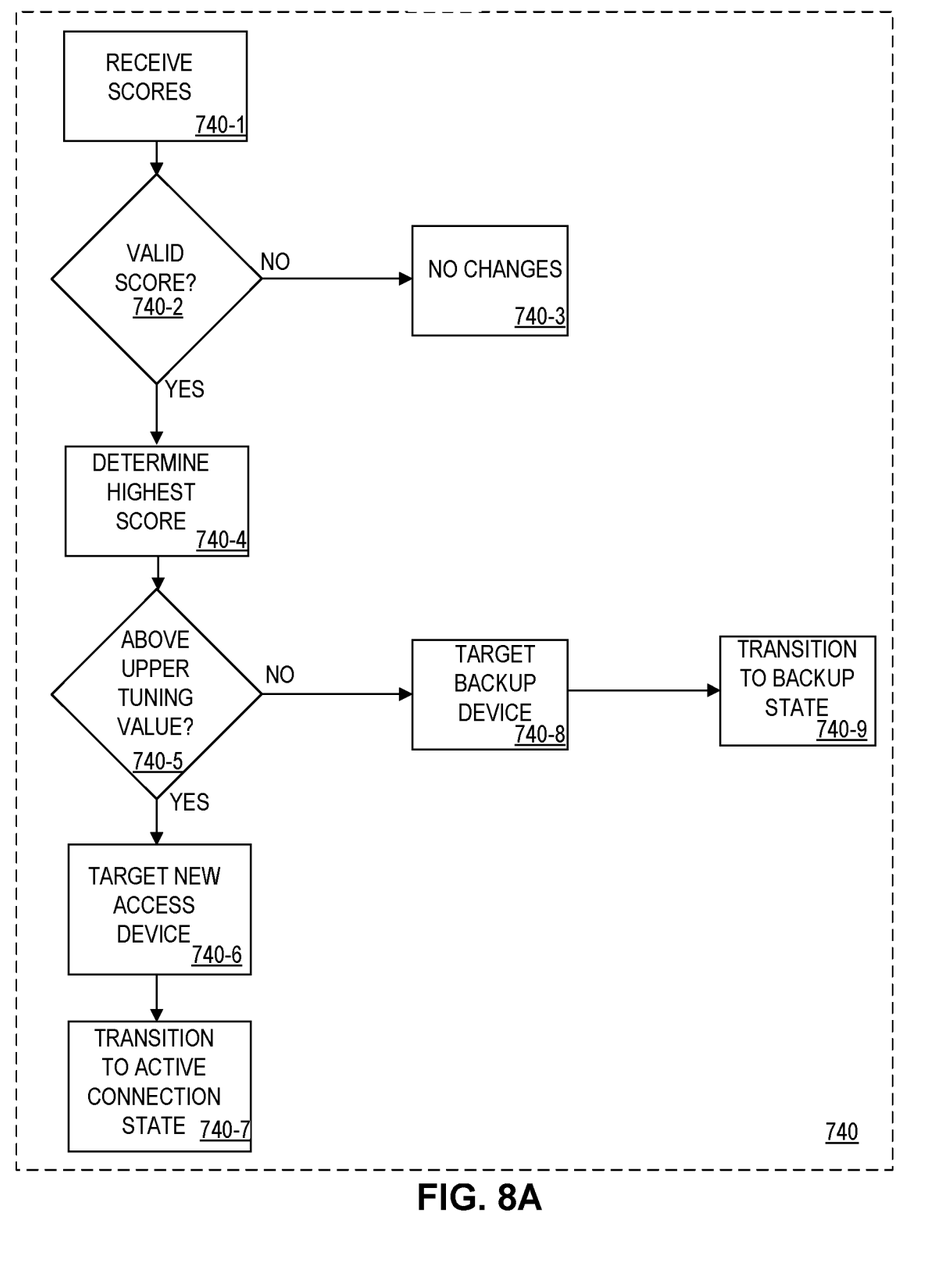
FIGS. 8A-8C are flow charts depicting methods of route selection performed at the routing device of FIG. 3.
Figure 8B:
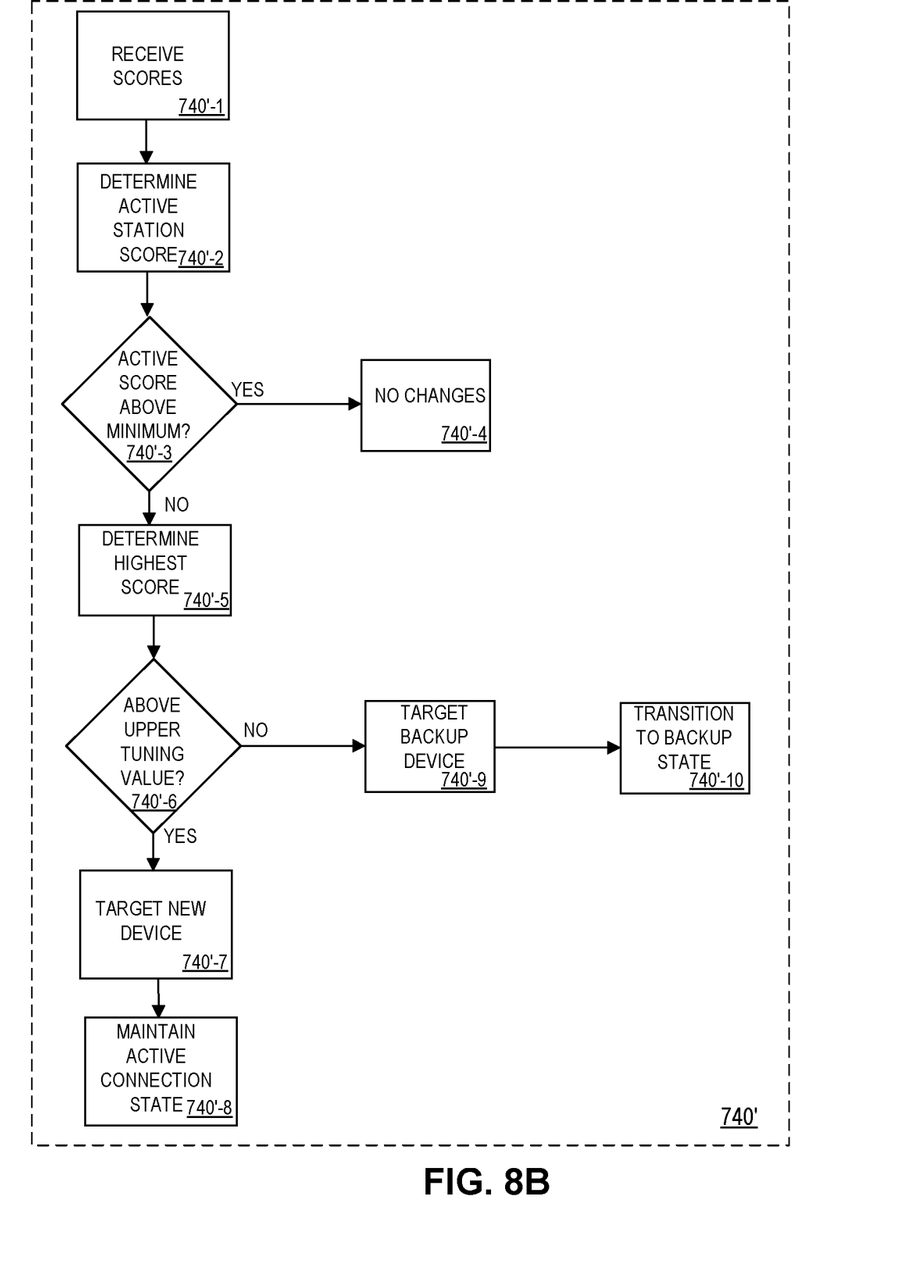
Figure 8C:
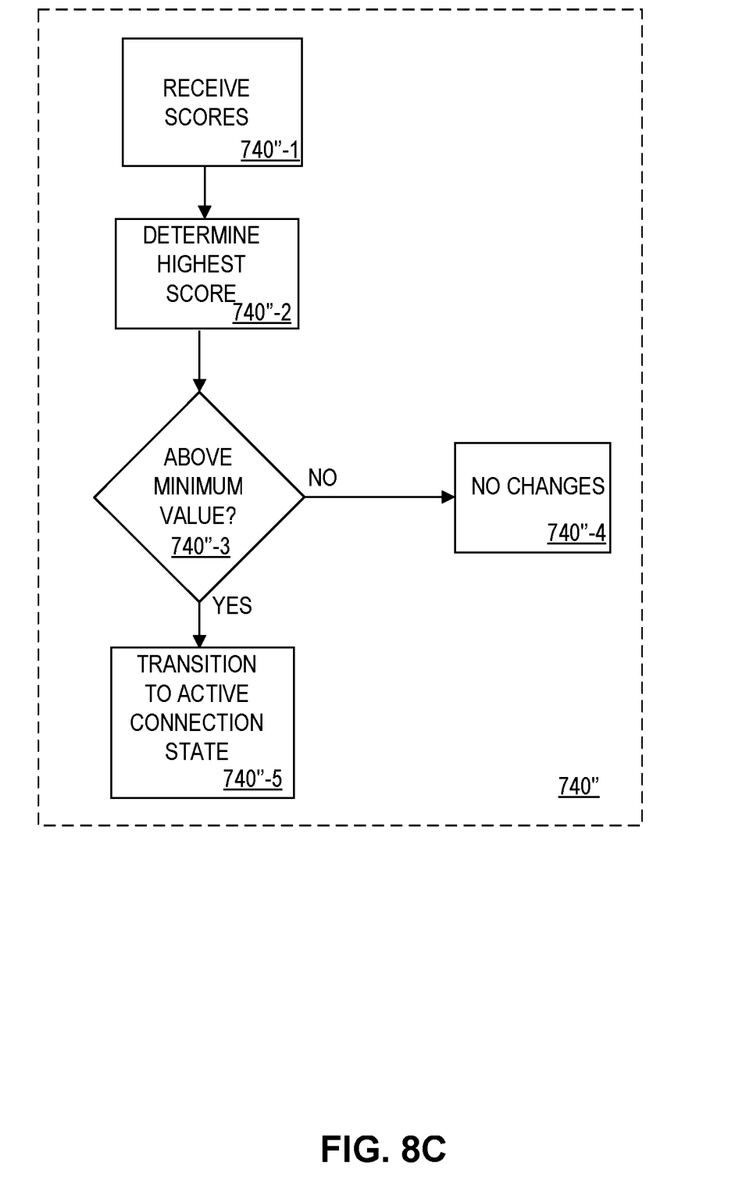

At block 740, route selector 154 evaluates the updated connection scores and makes routing decisions based on the current one of its three operating states 162, 164, 166 (FIG. 6). FIGS. 8A, 8B and 8C respectively depict processes performed by route selector 154 in its initialization state 162, active connection state 164 and backup state 166. For clarity, operations in the initialization state are indicated as 740-1, 740-2 etc.; operations in the active connection state are indicated as 740'-1, 740'-2, etc.; and operations in the backup state are indicated as 700"-1, 700"-2 etc.

As noted, immediately following initialization of routing device 110, route selector 154 is in its initialization state 162.

Referring to FIG. 8A, at block 740-1, route selector 154 receives connection scores from monitoring engine 152.

At block 740-2, route selector 154 determines if any of the received scores are valid. Invalid scores may result, for example, from errors in the monitoring process. If no valid score is received, the selection process terminates at block 740-3 without changing wireless access device 116 and without transitioning route selector 154 away from the initialization state.

At block 740-4, route selector 154 identifies the highest received connection score. At block 740-5, the route selector 154 determines if the highest score is above the upper tuning threshold. If so, at block 740-6, route selector 154 targets the wireless access device 116 having the highest score. At block 740-7, route selector 154 transitions to the active connection state 164 (FIG. 6).

Alternatively, if the highest connection score is below the upper tuning threshold, at block 740-8, the backup wireless access device 116-3 is targeted and at block 740-9, route selector 154 transitions to the backup state 166.

Referring to FIG. 8B, in the active connection state, at block 740'-1, route selector 154 receives scores for wireless access devices 116. At block 740'-2, route selector 154 identifies the score for the current active wireless device and at block 740'-3, route selector 154 evaluates the score for the current active wireless device 116 (e.g. device 116-1) against the lower tuning threshold (minimum accepted connection score).

A score above the lower tuning threshold indicates that the currently-active wireless access device 116 is providing a satisfactory (e.g. sufficiently fast) connection to WAN 106, and that an attempt to handover the currently-active wireless access device 116 between base stations likely is not imminent. Accordingly, if the score for the current wireless access device is above the minimum threshold, the current access device is maintained. The process terminates at block 740'-4 without targeting a new wireless access device and without transitioning route selector 154 away from the active connection state.

A score below the lower tuning threshold indicates that the currently-active wireless access device 116 is not providing a sufficient connection, or that a handover or attempted handover of the active wireless access device 116 may occur soon. Accordingly, a transition to another wireless access device 116 may occur to preserve connectivity.

At block 740'-5, route selector 154 identifies the highest received connectivity score and at block 740'-6, the score is compared against the upper tuning threshold. A score that is below the upper tuning threshold suggests that the connection quality is marginal, and transitioning to the associated wireless access device may lead to a another transition shortly thereafter. In other words, transitioning to a wireless access device 116 with a marginal connection may lead to frequent bouncing between devices. Such bouncing may impose unnecessary computational overhead on routing device 110 and may create or increase a risk of lost data packets.

At block 740'-7, if the highest score is above the upper tuning threshold, the corresponding device 116 is targeted for transition as the new active device. At block 740'-8, the process ends without transitioning out of the active connection state.

Conversely, if the highest score is not above the upper tuning threshold, route selector 154 reverts to the backup access device 116-3. At block 740'-9, the backup device 116-3 is targeted for transitioning as the new active device. At block 740'-10, the route selector 154 is transitioned to its backup state 116 (FIG. 6).

Referring to FIG. 8C, in the backup state 166, at block 740"-1, route selector 154 receives connection scores from monitoring engine 152 and at block 740"-2, route selector 154 determines the highest score.

At block 740"-3, route selector 154 compares the highest score to the minimum value, i.e. the lower tuning threshold. If the highest score is below the minimum threshold, none of wireless access devices 116 have a sufficient connection quality. Accordingly, the backup access device 116 continues to be used and the selection process ends at block 740"-4 without route selector 154 exiting its backup state 166.

Alternatively, if the highest connection score is greater than the upper tuning threshold, at least one of the access devices 116 has a sufficient connection quality. At block 740"-5, the wireless access device 116 with the highest connection score is targeted to become active.

At block 740"-6, route selector 154 transitions to its active connection state 164.

Referring to FIG. 7, at block 750, transition manager 156 determines if a transition to a new active access device is needed. Specifically, if an access device 116 or 117 is targeted at block 740, transition manager 156 determines if the targeted device is different than the current active device. If the targeted device is the same, or if no device is targeted, the process returns to block 720 and monitoring engine continues with periodic polling of access devices 116. If the targeted access device 116 is different than the currently active device, at block 760, transition manager 156 performs an access device transition.

Figure 9:
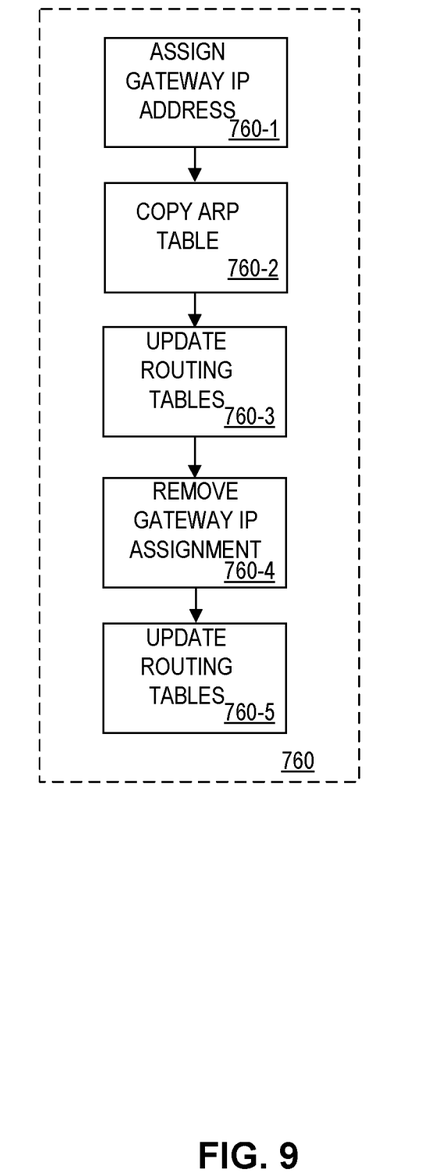
FIG. 9 is a flow chart depicting a method of handing over a wireless network connection, performed at the routing device of FIG. 3.

FIG. 9 depicts a transition process carried out by transition manager 156 at block 760.

At block 760-1, transition manager 156 assigns the external IP address associated with LAN 104 to the targeted wireless access device 116. For example, in the network topology of FIG. 2, the IP address range of WAN 106 is 10.1.*.* and LAN 104 has an external IP address of 10.1.1.2 at which devices on network 102 are accessible by devices on WAN 106. For a transition to wireless access device 116-2, external IP address 10.1.1.2 is assigned to wireless access device 116-2.

At block 760-2, neighboring hardware address information, such as an address resolution protocol (ARP) table containing hardware addresses (e.g. MAC addresses) of neighboring network devices is copied from the currently-active wireless access device to the target device. For example, in the topology of FIG. 2, for a transition to wireless access device 116-2, an ARP table is copied from interface 120-2 to interface 120-3.

At block 760-3, routing policies at routing device 110 are updated. Specifically, routes leading through the currently active wireless access device 116 to WAN 106 are edited to instead lead through the targeted wireless access device 116. In some embodiments, a default route of routing device 110 may be set to define the targeted wireless access device 116 as the next hop for packets intended for addresses outside LAN 104. Thus, updating of the routing policy causes traffic to be routed through the targeted wireless access device 116 to WAN 106.

At block 760-4, the external IP address assigned at block 760-1 is removed from the previous wireless access device 116. In the example of FIG. 2, IP address 10.1.1.2 is removed from wireless access device 116-1. Removal of the external IP address from the previous access device ensures that new incoming data packets sent to devices within LAN 104 are routed into network 114 through the new, targeted wireless access device 116-2.

At block 760-5, to ensure that routing of data packets inbound to LAN 104 is done correctly, a message is sent to synchronize hardware address data of neighboring network devices with the hardware address of the new (targeted) wireless access device. For example, an ARP message may be sent to cause downstream network nodes, switches and the like to synchronize their tables, such as ARP tables, filtering databases, etc. with the MAC address of the new wireless access device 116-2.

As noted above, connections between each of wireless access devices 116 and base stations 118 is monitored substantially continuously, by periodic polling. Monitoring of connection quality, rather than simply monitoring connectivity, allows routing device 110 to pre-empt handover or attempted handover of the active wireless access device between base stations, limiting or avoiding loss of connectivity caused by the handover or attempted handover. In other words, routing device 110 can anticipate an attempt to handover the active wireless access device and the accompanying loss of connectivity of that access device, and can transition routing to a new access device in order to seamlessly maintain connectivity of clients.

Unnecessary computational and network overhead may be limited by the polling interval and by the upper and lower connection score thresholds. The polling interval may, for example, be related to the speed at which connection quality tends to change in a specific application, which may be influenced by the speed of the moving platform in which the access devices are installed and the area serviced by base stations of the WAN. The lower tuning threshold influences the tendency of the routing device to switch between access devices. The upper tuning threshold reduces the likelihood that a transition will be made to an access device that with shortly thereafter provide insufficient connection quality, necessitating a further transition. Accordingly, network overhead associated with making a transition may be limited by raising the upper and lower tuning thresholds. In an example, polling occurs at 500 ms intervals and the upper and lower tuning threshold values are 13, 17 respectively.

The above examples are described with reference to IP addresses in the IPv4 format. As will be apparent, other types of addresses, such as IPv6 addresses may be substituted.

As described above, wireless access devices 116 have unique IP addresses in LAN 104 and selection of data paths is done by IP routing. In other embodiments, selection of data paths may be accomplished using different approaches. For example, wireless access devices 116 may be modems, such as WiMAX or cellular modems, and may be connected with routing device 110 by USB or other suitable interconnect. In such embodiments, selection of a path may be done by activating a specific USB port to use its connected modem for accessing WAN 106.

The above described embodiments are intended to be illustrative only and in no way limiting. The described embodiments of carrying out the invention are susceptible to many modifications of form, arrangement of parts, details and order of operation. Other variations are possible. The invention is defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A networking infrastructure for accessing a wide-area network (WAN) from a moving platform, comprising:
    a plurality of wireless access devices for wireless interconnection with base stations of said wide-area network (WAN), wherein said wireless access devices are handed off between base stations when a connection deteriorates;
    a routing device having an interface connected to each respective one of said wireless access devices, and an interface for connection to a client device, said routing device configured to route traffic to said WAN through an active one of said wireless access devices; and
    a processor at said routing device, configured to:
        monitor a metric of connection quality between said active wireless access device and said WAN; and
        in response to said metric of connection quality for said active wireless access device dropping below a lower threshold value, reconfigure said routing device to route data traffic to said WAN through a targeted wireless access device having the highest metric of connection quality of said wireless access devices if the metric of connection quality of targeted wireless access device is above an upper threshold value.

2. The networking infrastructure of claim 1, wherein said processor is configured to monitor a metric of connection quality between each of said wireless access devices and said WAN.

3. The networking infrastructure of claim 1, wherein said processor is configured to pre-empt handover of said active wireless device by routing data traffic through said targeted wireless access device during handover of said active wireless access device.

4. The networking infrastructure of claim 1, wherein said routing device comprises a routing policy directing data traffic through said WAN through said active one of said wireless access devices.

5. The networking infrastructure of claim 4, wherein said processor is configured to, in response to said metric of connection quality for said active wireless access device dropping below said lower threshold value, reconfigure said routing device by updating a default route in said routing policy.

6. The networking infrastructure of claim 1, wherein said processor is configured to monitor said wireless access devices by periodic polling.

7. The networking infrastructure of claim 1, further comprising a backup wireless access device connected to an interface of said routing device, wherein said processor is configured to reconfigure said routing device to direct traffic to said WAN through said backup wireless access device in response to said metric of connection quality for said active wireless access device dropping below said lower threshold value while said metric of connection quality is below said upper threshold value for all of said wireless access devices.

8. The networking infrastructure of claim 1, wherein said wireless access devices are WiMAX access devices.

9. The networking infrastructure of claim 8, wherein said WAN is a private WAN.

10. A routing device for installation on a moving platform, comprising:
    a plurality of ports for connection to wireless access devices for wireless interconnection with base stations of a wide-area network (WAN), wherein said wireless access devices are handed off between base stations when a connection deteriorates, said routing device configured to route traffic to said WAN through a wireless access device at an active one of said ports;
    an interface for connection to a client device; and
    a processor, configured to:
        monitor a metric of connection quality between said wireless access devices at said active one of said ports and said WAN; and
        in response to said metric of connection quality for said wireless access device at said active port dropping below a lower threshold value, reconfigure said routing device to route data traffic to said WAN through a wireless access device at a targeted one of said ports having the highest metric of connection quality of said wireless access devices at said ports if the metric of connection quality of the wireless access device at the targeted one of said ports is above an upper threshold value.

11. The routing device of claim 10, wherein said processor is configured to monitor a metric of connection quality for wireless access devices connected to each of said ports, said metric of connection quality representative of connection quality between the respective wireless access device and said WAN.

12. The routing device of claim 10, wherein said processor is configured to route data traffic through said wireless access device at said targeted port during handover of said wireless access device at said active port.

13. The routing device of claim 10, wherein said routing device comprises a routing policy directing data traffic through said WAN through said wireless access device at said active port.

14. The routing device of claim 13, wherein said processor is configured to, in response to said metric of connection quality for said active wireless access device dropping below said lower threshold value, reconfigure said routing device by updating a default route in said routing policy.

15. The routing device of claim 10, wherein said processor is configured to monitor wireless access devices at said ports by periodic polling.

16. The routing device of claim 10, further comprising a backup port for connecting a wireless access device, wherein said processor is configured to reconfigure said routing device to direct traffic to said WAN through said backup wireless access device in response to said metric of connection quality for said active wireless access device dropping below said lower threshold value while said metric of connection quality is below said upper threshold value for all of said wireless access devices.

17. A routing method in a computing network, comprising, at a routing device:
configuring a data path to direct data traffic towards a wide-area network (WAN) through a first wireless access device of a plurality of wireless access devices;
monitoring a metric of connection quality between said first wireless access device and said WAN; and
in response to said metric of connection quality for said first wireless access dropping below a lower threshold value, reconfiguring said data path to route data traffic to said WAN through a second wireless access device having the highest metric of connection quality of the plurality of wireless access devices if the metric of connection quality of the second wireless access device is above an upper threshold value.

18. The method of claim 17, wherein said monitoring comprises monitoring a metric of connection quality for each of said wireless access devices, said metric of connection quality representative of connection quality between said respective wireless access device and said WAN.

19. The method of claim 17, comprising routing data traffic through said second wireless access device at during handover of said first wireless access device between base stations of said WAN.

20. The method of claim 17, wherein said configuring a data path comprises updating a default route in a routing policy.

21. The method of claim 17, comprising sending an address resolution protocol message toward said WAN through said second wireless access device.

22. The method of claim 17, wherein said monitoring comprises periodic polling.

\* \* \* \* \*